United States Patent [19]
Silverstein et al.

[11] Patent Number: 6,099,725
[45] Date of Patent: Aug. 8, 2000

[54] TOWER PRESS FILTERING SYSTEM

[75] Inventors: Alan Silverstein, Emmeus, Pa.; Esko Riikonen, Columbia, Md.; Mikhail Pavlovich Yuryev, Berdichev, Ukraine; Vitaliy Grigoryevich Saenko, Berdichev, Ukraine; Yuriy Dmitrievch Gorodyskiy, Berdichev, Ukraine

[73] Assignee: The Bethlehem Corporation, Easton, Pa.

[21] Appl. No.: 09/090,527

[22] Filed: Jun. 4, 1998

[51] Int. Cl.[7] .................................................. B01D 25/19
[52] U.S. Cl. .......................... 210/227; 210/230; 210/236; 210/344; 210/350
[58] Field of Search .................................. 210/227, 230, 210/232, 236, 344, 350, 483, 488, 495

[56] References Cited

U.S. PATENT DOCUMENTS

| | | | |
|---|---|---|---|
| 618,964 | 2/1899 | Theurer | 210/350 |
| 1,903,368 | 4/1933 | Symons et al. | 210/227 |
| 2,345,259 | 3/1944 | Hunziken | 210/227 |
| 2,757,802 | 8/1956 | Schmid | 210/344 |
| 2,902,159 | 9/1959 | Temple | 210/236 |
| 3,389,802 | 6/1968 | Stöbe | 210/344 |
| 4,552,660 | 11/1985 | Schotten | 210/227 |
| 4,702,833 | 10/1987 | Miyata | . |
| 5,045,199 | 9/1991 | Fast et al. | . |
| 5,445,745 | 8/1995 | Handtmann | . |
| 5,453,184 | 9/1995 | Handtmann | . |

*Primary Examiner*—Christopher Upton
*Attorney, Agent, or Firm*—Rosenberg, Klein & Lee

[57] ABSTRACT

A tower press filtering system (1) is provided. System (1) includes a frame assembly (10) having at least one support engagement portion (14); a collapsible filter tower assembly (20) having a plurality of displaceable filter plate members (20); a press assembly (30) having a support plate member (300), a compression mechanism (320), and a press plate (326); and, a stabilization assembly (40) for automatically maintaining press plate (326) in a fixed planar orientation during displacement thereof. System (1) also includes a port assembly (50) having a substantially rigid conduit segment (52) that maintains coupling with the manifold section (210) of at least one filter plate member (200). System (1) also includes a mechanism by which the coupling of each compression mechanism (320) employed may be adjustably coupled to support plate (300). Stabilization assembly (40) includes at least one coupling portion (405) that maintains meshed coupling with a support engagement portion (14) formed on frame assembly (10).

20 Claims, 6 Drawing Sheets

TOWER PRESS FILTERING SYSTEM

BACKGROUND OF THE INVENTION

1. Field of the Invention

The subject tower press filtering system is generally directed to a system for filtering solid particulates from a liquid. More specifically, the tower press filter system is directed to a system for extracting and compacting the solids from a substance having both solid and liquid components such as industrial slurry products, by-products, and the like. In chemical, mining, and other applications, both industrial and non-industrial, it is often desirable to separate as completely as possible the solid and liquid components of a given slurry material. The end product desired may, depending on the particular application intended, be the resulting liquid filtrate, the extracted solid particulates, or both. In any event, the filtering process is aided by a compression step whereby the solid particulates initially extracted by a filter medium from the filtrate are compacted to essentially squeeze out any remaining liquid. The resulting cake of solid particulates is washed, dried, then removed from the filtering system.

Such a filtering process is typically carried out in the art within a tower press filtering system having a plurality of displaceably stacked filter plates between adjacent ones of which an endless loop filter medium is routed. The stacked filter plates are clamped together and pulled apart by a clamping mechanism that actuates accordingly the displacement of a press plate coupled to the stack. The system typically operates as follows. The stacked filter plates are clamped together in sealed manner such that a chamber is formed above a span of the filter medium between adjacent filter plates. The material to be filtered is then fed into the chambers thus formed, and an initial filtering process occurs whereby filtrate within each chamber passes through the given span of filter medium and drains via the filter plate therebeneath. A compression process is next effected by suitable means known in the art, such as an expandable diaphragm in each chamber controlled by hydraulic pressurization, to compact the solid particulates collected on the filter medium in the chambers into cakes. After sufficient progression of this process, each diaphragm or other compression means employed, is depressurized to remove the compacting force from the resulting cakes, and a pressurized washing liquid is introduced into and through each chamber to wash away any unwanted liquids, salts, or other impurities. Each diaphragm is pressurized once more thereafter to squeeze the washing liquid out from the solid cakes. Finally, each diaphragm is again depressurized, and high pressure air is passed through the chambers to thoroughly dry the cakes remaining therein.

These steps form but one cycle of a filtering process. Upon formation of a solid cake as described, the clamping mechanism draws the filter plates apart, and a drive mechanism advances the loop of filter medium, causing discharge of the formed cakes from the filter plates. The filtering cycle is then repeated with each span of filter medium having advanced to the next pair of adjacent filter plates, or to/through a washing basin/chamber.

This type of tower press filtering system operates continuously over substantial stretches of time in many industrial applications. The dimensions and weights of components in such a system are necessarily quite significant, as they must accommodate high pressure operation and yield high filtering capacity. The compacting diaphragm, for instance, is pressurized in an exemplary application at approximately 230 psi, requiring the surrounding filter plates to be formed from steel, dense plastic, or other such heavy duty material of comparable strength and rigidity. Each filter plate is formed from such material to encompass, on average, five to ten square feet of filtering chamber area and a sufficient number of filter plates are employed in a given tower press to obtain 300–400 square feet of cumulative filtration area. This makes for a great number of very heavy filter plates, the precise, cyclic movement of which, over even a short period of time, becomes quite a challenge. Yet, highly precise and highly synchronized movement of such filter stacks is essential to productive operation of the system.

Without a sufficient degree of precision and synchronization, the coordinated coupling of adjacent filter plates—hence, the formation of adequate seals necessary for proper operation—may be compromised. Also, the consistency and uniformity of the compacting pressure applied to the solid particulates collected within given filtering chambers that is necessary for efficient formation of a consistently dry cake may be significantly disrupted, as may the level transport of the cakes on the advancing filter medium that is necessary to avoid premature or misdirected discharge thereof. Consequently, there is generally a need for appropriate measures by which the movement of components in a tower press filtering system is maintained in highly precise and synchronized manner.

In light of the continual movement of components having great bulk and weight in many tower press filtering systems, it is important that the means by which an air/liquid injection port is coupled to the feed ports/passages in the stacked filter plates are coupled in sealed manner to an air/liquid conduit be characterized by a sufficient degree of resilience. This resilience must be of sufficient nature and degree to withstand both vertical and lateral displacement deviations which invariably occur as the bulky, heavy filter plates are caused to move, stop, and periodically abut one another. Factor in the fact that in many industrial applications of tower press filtering systems, the material to be filtered is highly corrosive or otherwise noxious, it is also important that the resilience be accompanied by great durability. This is quite important to the actual utility, in practice, of a given tower press filtering system.

Another consideration of great practical importance is the configurability of the given filtering system. With its heavy duty construction and durable yet precise mechanization necessary in spite of that heavy duty construction, a tower press filtering system invariably represents a substantial capital investment. Hence, it is not feasible, much less prudent, to simply replace a given tower press filtering system with another of different configuration where, for instance, space or operational constraints restrict the stacked filter plates in the system on hand to a different number or to those having different dimensions. Convenient means whereby the system could be readily adapted to the insert, removal, or replacement of one or more filter plates would be highly desirable in such cases.

2. PRIOR ART

Tower press filtering systems which carry out the basic operational cycle described in preceding paragraphs are known in the art. In those known systems, a plurality of filter plates are displaceably coupled to a frame assembly and clamped together or drawn apart by a suitable clamping mechanism—often, a pair of piston and cylinder assemblies situated on opposing sides of the prevailing filter plate stack. The piston and cylinder assemblies extend from a support plate to a press plate between which the filter plate stack is disposed. The contraction of the piston and cylinder assemblies cooperatively draw the press plate toward the support plate until the press plate 'closes' the stacked filter plates by clamping them together against the support plate. Conversely, the expansion of the piston and cylinder assemblies draws the press plate away from the support plate to thereby pull the stacked filter plates sufficiently apart to allow free advancement of the filter medium passed therebetween.

Each filter plate is formed with a substantially planar top surface which serves as the underlying support for the section of filter medium extending across it. Beneath this upper surface is defined a recess for receiving the material to be filtered. Each filter plate also includes a pair of manifold sections, usually located at the planar periphery of the filter plate. The manifold sections respectively define vertically extended conduit sections—one conduit section whose inner passage communicates with the given filter plate's inner recess through an inlet port formed therebetween, and the other conduit section communicating with drainage passages suitably formed to extend from the given filter plate's top support surface to collect and drain the flow of filtrate and other liquids passing through the filter medium section immediately above the top surface.

During operation of the system, a filtering cycle is initiated by the closing of the filter plate stack. A plurality of filtering chambers are then formed between adjacent filter plates when the top plate of one filter plate (and the section of filter medium passing across it) abuts the filter plate situated immediately above it to cover that plate's inner recess. Typically, the filter plates are dimensioned such that a filter chamber having a height dimension on the order of approximately two inches is formed between adjacent plates. The respective manifold sections of the stacked filter plates are, at this point, coupled together in sealed manner to define an inlet distribution conduit and a multi-access drainage conduit.

A slurry or other material to be filtered is then fed through the inlet distribution conduit until each of the filtering chambers between the stack of filter plates are filled. Solid particulates remain within those chambers while filtrate passes through the sections of filter medium lining the filtering chambers and drains to and through the drainage conduit. A compression process is then carried out within each of the filtering chambers to compact the solid particulates, squeezing out the remaining liquids. Various means are employed in the art for this compression process. An oft-employed means, however, is the provision of a liquid-impermeable membrane lining the surface of a given filter plate that substantially defines its inner recess. Thus situated, the membrane extends across the plane overlying the given filtering chamber.

In an exemplary system, such membrane in each filtering chamber is expanded by hydraulic means to serve as a pressurized diaphragm that exerts a downward pressing force on the solid particulates collected within that chamber. What then results within each chamber is a cake of solid particulates.

Often it is desirable to subject the cakes thus formed to a washing process to remove any salts or other impurities therefrom. Where this is the case, the compression force is removed from each cake by, for instance, depressurizing the membranes. A washing liquid is then pumped via the inlet distribution conduit to essentially rinse the cakes within their respective filtering chambers. Next, another compression step is performed as before whereby excess rinsing liquid remaining about and within the cakes is squeezed out. Finally, after the compression force is again removed, a drying step is carried out by introducing a high pressure flow of air or other gaseous stream through the filtering chambers, via the inlet distribution conduit.

The cakes are thereafter ready for discharge; and, the clamping cylinder assemblies are expanded to draw the filter plates apart. A drive mechanism then advances the filter medium by a predetermined length, the cakes being transported on the filter medium and discharged therefrom as the filter medium segments transporting them pivot about supporting roller structures. The cakes having been discharged from the filter medium in this manner, the drive mechanism is deactivated for the commencement of another filtering cycle.

SUMMARY OF THE INVENTION

It is an object of the present invention to provide a tower press filtering system wherein the displacement of system components during operation occurs with great stability.

It is another object of the present invention to provide a tower press filtering system wherein the system may be simply and conveniently reconfigured to offer one or more selectable system component displacement ranges.

It is yet another object of the present invention to prevent misalignment or misorientation of the tower press filtering system's filter plates during their displacement.

It is still another object of the present invention to provide a tower press filtering system having an extremely durable conduit segment operably coupled to the system's filter tower assembly.

These and other objects are attained in the subject tower press filtering system supporting a pliant filter medium for separating the solid and liquid components of a slurry material introduced therein. The system generally comprises: a frame assembly; a collapsible filter tower assembly coupled to the frame assembly; a press assembly coupled to the filter tower assembly and press assemblies; and, a stabilization assembly coupled to the press and frame assemblies. The frame assembly includes at least one support engagement portion. The collapsible filter tower assembly includes a plurality of displaceable filter plate members adapted to engage respective portions of the filter medium passed therebetween; and, each filter plate member is formed with a manifold portion. The press assembly includes a support plate member and a compression mechanism coupled to the filter tower assembly and the support plate member. The compression mechanism is operable to retractably clamp the filter tower assembly against the support plate member along a press axis, and is adapted to impart on the filter tower assembly a clamping force characterized by a predetermined force direction relative to the support plate member. The stabilization assembly operates to automatically maintain the predetermined force direction of the compression mechanism clamping force in substantial alignment with the press axis during operation of the press assembly. The stabilization assembly includes at least one coupling portion that maintains meshed coupling with one of the support engagement portions of the frame assembly.

DESCRIPTION OF THE PREFERRED EMBODIMENTS

Figure 1:
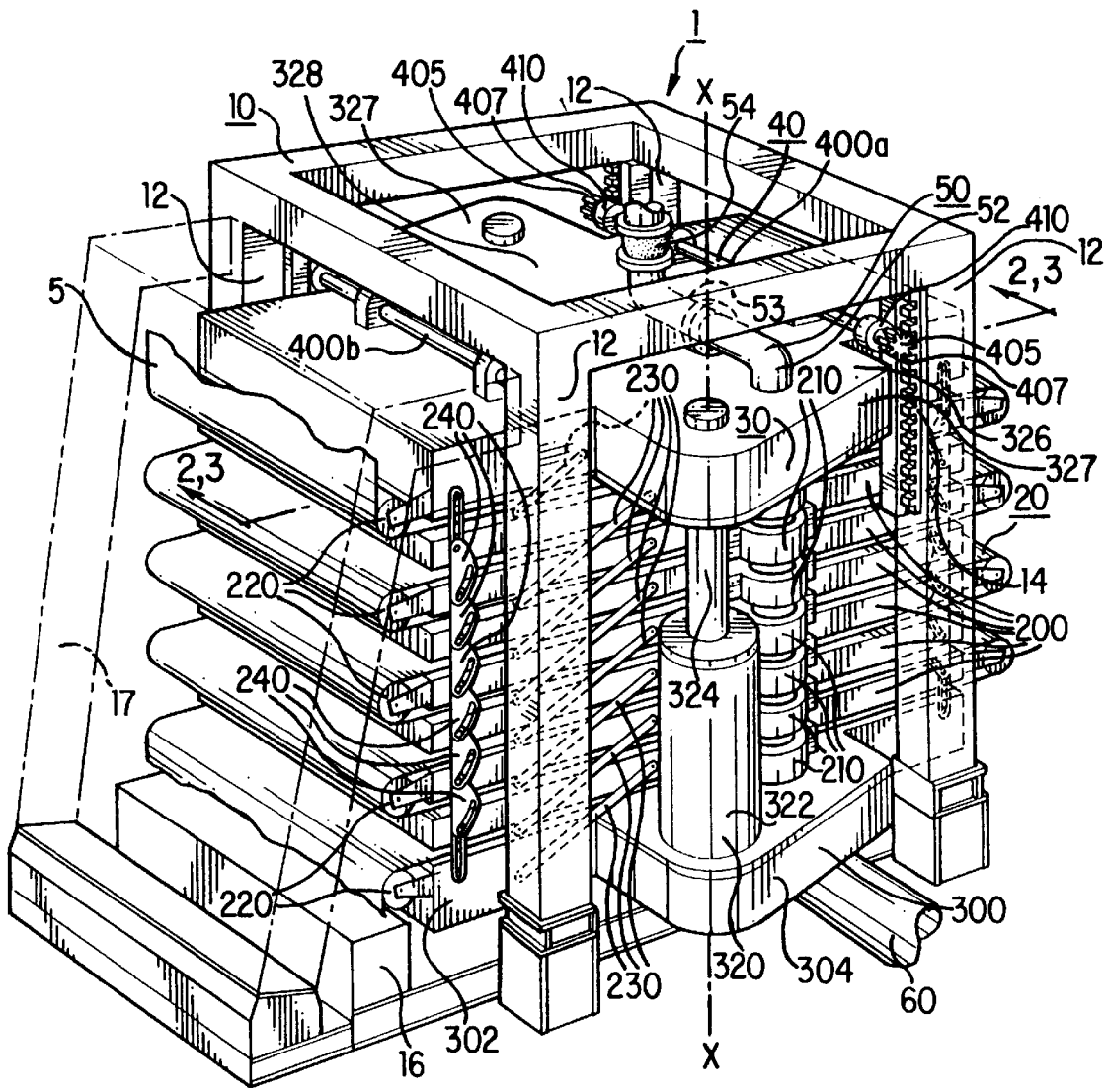
FIG. 1 is a perspective view of one embodiment of the subject tower press filtering system.

Turning now to FIG. 1, there is shown an embodiment of the subject tower press filtering system. Tower press filtering system 1 is adapted to retain a pliant filter medium 5 which is preferably configured as an endless loop that is periodically advanced through and between various portions of the system. Tower press filtering system 1 generally comprises a frame assembly 10; a collapsible filter tower assembly 20 coupled to frame assembly 10; a press assembly 30 coupled to both frame assembly 10 and filter tower assembly 20; and, a stabilization assembly 40 coupled to press assembly 30 and frame assembly 10. System 1 also comprises an injection port assembly 50 operably coupled to filter tower assembly 20 for the forced injection therethrough of drying air and washing liquid. System 1 further comprises one or more conduits 60 operably coupled to filter tower assembly 20 for feeding and/or draining the material being filtered. Filter tower assembly 20 is retained within frame assembly 10 and periodically expanded to an open configuration, then collapsed to a closed configuration, by operation of press assembly 30. Suitable measures known in the art are in place to insure the sealed coupling of filter tower assembly 20, when in its closed configuration, with port assembly 50 as well as feed and drain conduits 60.

Frame assembly 10 includes a plurality of leg members 12 which provide points of support for the various components of the filter tower and press assemblies 20, 30. Frame assembly 10 also includes at least one support engagement portion 14 preferably formed to include a linear gear rack-like guide surface having a plurality of tooth projections. Each support engagement portion 14 is preferably provided on a frame assembly leg member 12. As it bears a significant load in stabilizing press assembly 30 during its operation, each support engagement portion 14 is preferably formed of steel or other material of sufficient strength, rigidity, and durability.

Frame assembly 10 preferably includes a washing station 16 through which filter medium 5 passes during its looped advancement within the system. Frame assembly 10 further includes a side portion 17 shown in phantom lines so as not to impede the visibility of system features. Side portion 17 serves not only a structural reinforcement function, it provides a firm point of support for the attachment of tensioning pulley mechanisms and such (not shown) which aid in proper retention of filter medium 5.

Filter medium 5 is preferably provided as an endless loop of filtering fabric material such as polypropylene, polyester, a combination of those materials, or other fibrous material of sufficient strength and comparable filtering properties. While a portion of filter medium 5 is shown cut away for clarity, it forms a continuous loop that passes between each adjacent pair of filter plates of tower assembly 20, through washing station 16 and about one or more of the tensioning pulley mechanisms (not shown) secured to frame assembly side portion 17. The loop then continues back into engagement with the upper-most filter plate of assembly 20.

Filter tower assembly 20 includes a plurality of substantially planar filter plates 200 displaceably stacked one over the other. Each filter plate 200 is preferably of the type known in the art described in preceding paragraphs. The precise structural configuration of each filter plate 200 is not important to the present invention and, therefore, not described in further detail, except to the extent necessary to enable a thorough understanding of the disclosed system's overall structural and functional features.

Each filter plate 200 includes a pair of manifold sections 210, though only one is visible in FIG. 1. The other manifold section 210 of each filter plate 200 is disposed on the side of that filter plate 200 directly opposed to the manifold section 210 shown. When filter tower assembly 20 is in its closed configuration, manifold sections 210 of adjacent filter plates 200 couple together in sealed manner to form inlet distribution and drainage conduits. Each filter plate 200 also has formed on longitudinal ends thereof a pair of roller mechanisms 220 about which filter medium 5 pivots as it travels its weaving path through tower filter assembly 20. In order to insure that the travel of filter medium 5 over roller mechanisms 220 remains straight and true, as well as to insure that their manifold sections 210 will couple together in properly sealed manner when filter tower assembly 20 is closed, filter plates 200 are disposed in vertically displaced but laterally aligned manner.

Filter plates 200 are each coupled to frame assembly 10 in such manner that it may be linearly displaced in a vertical direction. Preferably, each filter plate 200 is suspended from frame assembly 10 by a pair of pivotal support arms 230 (though only one support arm 230 is visible in the Figure for each filter plate 200), each having one end pivotally coupled to a frame assembly leg member 12 and an opposing end pivotally coupled to a sidewall portion of the given filter plate 200. Filter plates 200 are, moreover, coupled together by a chain of coupling link mechanisms 240 which, together with pivotal support arms 230, effectively operate to permit the plate's displacement relative one another only in the vertical direction.

Other means by which filter plates 200 are displaceably coupled to frame assembly 10 are readily conceivable. For instance, laterally projecting members may be formed onto each filter plate 200 for retention within elongate slotted tracks formed along two or more leg members 12 of frame assembly 10. Other such variations on the coupling mechanism are equally conceivable, and the present invention is not limited to the incorporation of any particular type.

Press assembly 30 includes a support plate 300 supported on and secured to frame assembly 10; and, a compression mechanism 320 coupled to filter tower assembly 20 and this support plate 300 for retractably clamping filter tower assembly 20 against the stationary support plate 300. Support plate 300 is formed with a body portion 302 having a substantially planar upper surface against which the collapsible tower filter assembly 20 is pressed downward and clamped during operation of system 1. Press assembly 30 also includes a pair of laterally extending platform portions 304 (only one visible) on opposing sides of body section 302. The platform portion 304 on the side of support plate 300 that is not visible in FIG. 1 preferably includes a drain passage formed therethrough to which the manifold section 210 on that hidden side of the bottom-most filter plate 200 is coupled in sealed manner from above and a drainage conduit 60 (also not visible) is coupled from below. Such coupling is not explicitly shown, for it may be effected by any suitable means known in the art. Similarly, the visible platform portion 34 includes a conduit passage formed therethrough to which a manifold portion 25 of the bottommost filter plate 200 is coupled from above and to which a feed conduit 60 is coupled from below. Each platform portion 304, in addition, includes an opening through which compression mechanism 320 is secured thereto, as described in following paragraphs.

As it serves a significant support function, support plate 300 is preferably formed of steel or other material of comparable strength, hardness, and durability. The material to be filtered may, in many applications, be quite corrosive or otherwise chemically and thermally noxious. The material composition employed for support plate 300 must be adequately suited to withstand repeated exposure to such materials. This is especially so, for support plate 300, by its location and function within system 1, is continually subject to contact by an assortment of run-off and leakage materials.

Compression mechanism 320, in one embodiment, employs a hydraulically or pneumatically driven force generating unit having a pressurized cylinder member 322 and a piston member 324 telescopically coupled thereto. The structure and principles of operation for such a piston-cylinder force generation unit is well-known, and will not be further described except to the extent necessary to describe the specific features of the present invention. Press assembly 30 preferably includes a pair of such piston/cylinder units 320, the second unit being coupled to the platform portion 304 projecting from the side of support plate 300 not visible in FIG. 1 in substantially the same manner shown.

Press assembly 30 also includes a press plate 326 having a pair of platform projections 327 extending from a substantially planar body portion 328. Each platform portion 327 of press plate 326 extends laterally from body portion 328 to substantially overhang respective platform portions 304 of support plate 300. Each platform projection 327 provides a coupling point for a piston member 324, securely receiving in a through opening formed therein a terminal portion of the given piston member 324. Suitable means known in the art are employed to secure this coupling such that press plate 326 is rendered substantialy immovable relative to piston members 324. At least one platform projection 327 of press plate 326 has also formed therein a through opening sufficiently dimensioned to receive therethrough a substantially rigid conduit segment 52 of port assembly 50 as described in following paragraphs.

Press plate 326 is thus coupled to piston members 324 for linear displacement along a press axis X as piston members 324 are concurrently actuated for movement relative to their respective cylinder members 322. Press plate 326 is provided with a substantially planar inner surface portion (not visible in FIG. 1) that extends to form the bottom face of the plate's body portion 328. This inner surface portion serves to squarely and evenly abut the top surface portion of the uppermost filter plate 200 when tower filter assembly 20 is clamped downward towards support plate 300.

Figure 2:
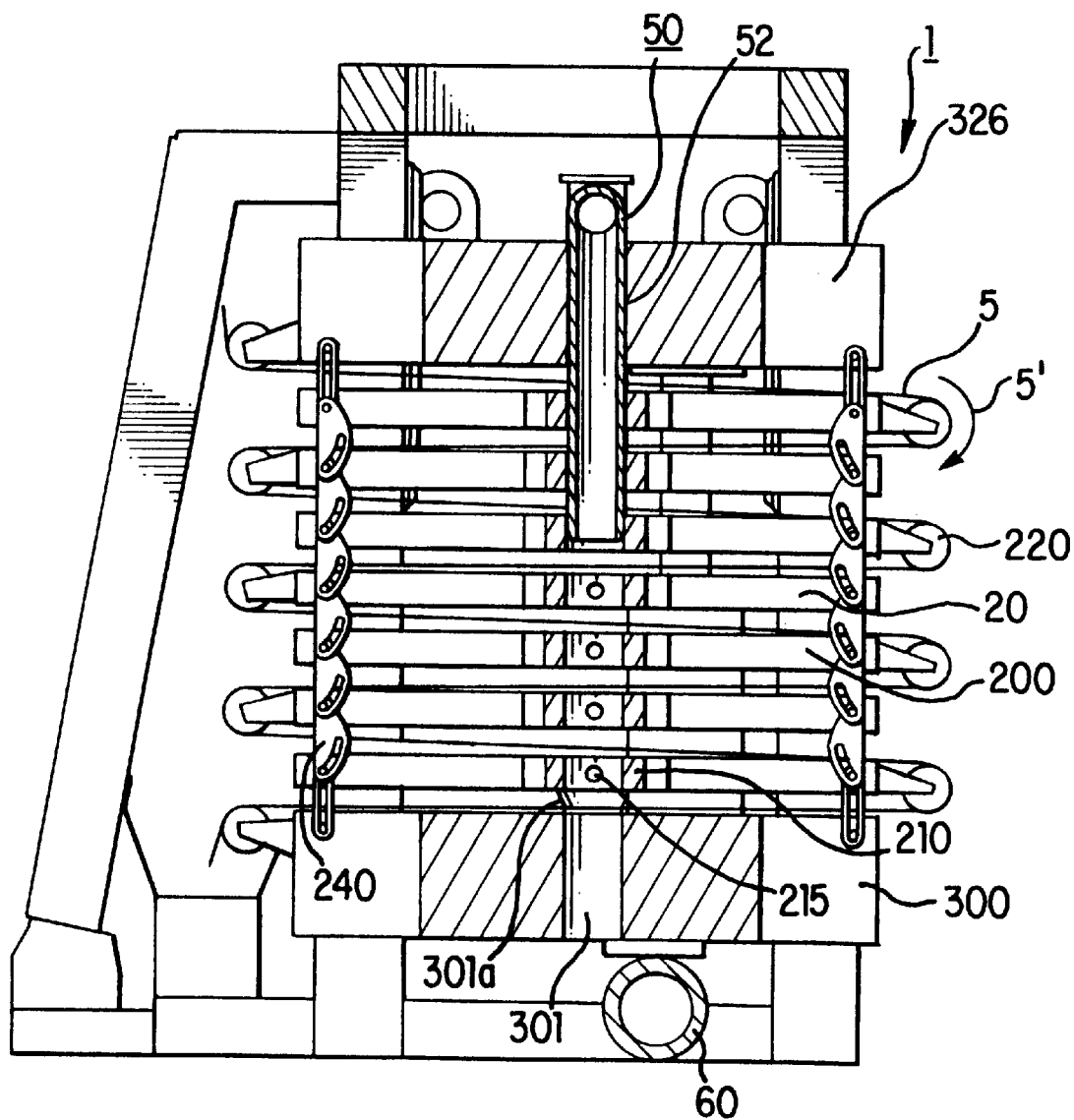
FIG. 2 is an elevational schematic view, partially cutaway, of the embodiment of the subject tower press filtering system shown in FIG. 1 in its 'open' configuration.
Figure 3:
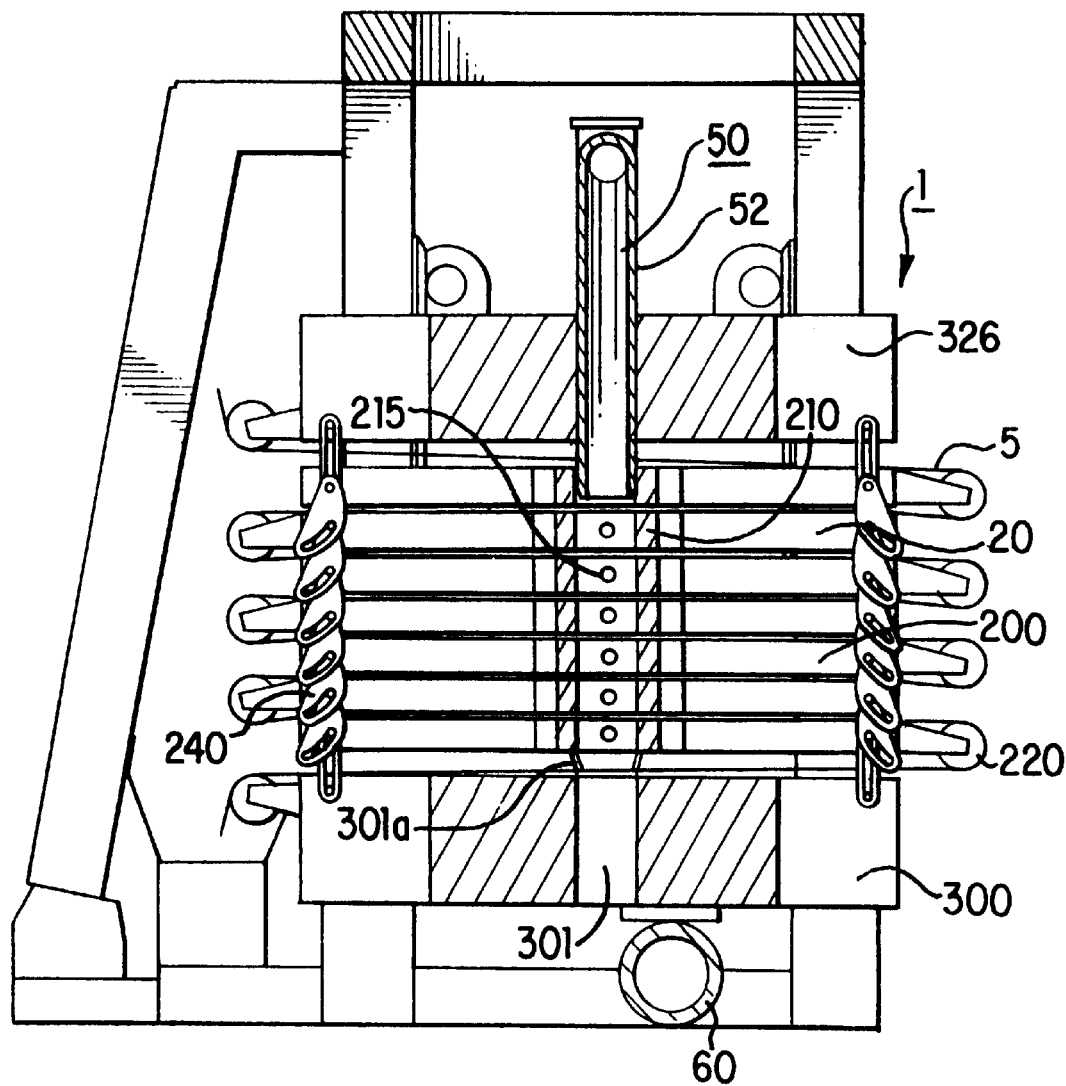
FIG. 3 is an elevational schematic view, partially cut-away, of the embodiment of the subject tower press filtering system shown in FIG. 1 in its 'closed' configuration.

Referring to FIGS. 2–3, there are shown schematic diagrams respectively illustrating the 'open' and 'closed' configurations of system 1. In the open configuration shown in FIG. 2, the solid particle cakes (not shown) formed as described in preceding paragraphs during the filtering cycle of system operation are automatically discharged as filter medium 5 is advanced over rollers 220 along the direction indicated by directional arrows 5'. Coupling link mechanisms 240 operate to maintain substantially even spacing between adjacent filtering plates 200 to enable the free, unobstructed transport of the solid cakes with the moving filter medium 5.

In the 'closed' configuration of system 1 shown in FIG. 3, no advancement of filter medium 5 occurs, the system being configured for a filtering cycle also described in preceding paragraphs. During that cycle, the slurry or other material to be filtered is passed through feed conduit 60, then through feed passage 301 formed in support plate 300, through a sealed coupling mechanism 301a, and into the inlet distribution conduit formed collectively by the aligned manifold sections 210 of filter plates 200. The slurry material distributes accordingly at each filter plate 200 through inlet distribution passages 215 formed therein. Sealed coupling mechanism 301a may be of any type known in the art suitable to maintain the necessary sealed coupling between passage 301 of support plate 300 and manifold section 210 of the bottommost filter plate 200 during the forced injection of the slurry material into system 1.

Sealed coupling of a fluid injection port for the forced injection of liquid or air to support the washing and drying phases of system operation is provided in accordance with one aspect of the present invention via port assembly 50. In contrast to prior art techniques whereby a flexible conduit segment, such as a hose assembly formed of a rubber material, would be coupled to the manifold section 210 of the uppermost filter plate 200 so as to tolerate the repeated displacement thereof, port assembly 50 includes a substantially rigid conduit segment 52 that extends in length to maintain sealed coupling with the uppermost filter plate 200 when tower filter assembly 20 is collapsed in the system's 'closed' configuration. When filter tower assembly 20 is expanded to the system's 'open' configuration, filter plates 200 displace relative to conduit segment 52, the respective manifold sections 210 of the filter plates 200 in the upper portion of tower filter assembly 20 matingly engaging conduit segment 52. Press plate 326 also displaces relative to conduit segment 52 which passes through an accommodating opening formed therein.

To allow for some lateral (or vertical) movement of conduit segment 52 which invariably comes about during operation of system 1, port assembly 50 includes a resilient coupling 54 which couples an intermediate conduit segment 53 leading from conduit segment 52 to a fluid injection port (not fully shown). This resilient coupling 54 is formed of a heavy rubber or other comparable material known in the art capable of withstanding repeated exposure to the harsh thermal, chemical, and mechanical environments to which it would be exposed during many applications of system 1. Rigid conduit segment 52 is, in contrast, formed of steel or other material of comparable strength, rigidity, and durability capable of withstanding repeated and continued exposure to such harsh environments without breakage or distortion of shape.

For proper, consistent, and reliable operation of system 1, it is important that the displacement of each filter plate 200 effected by the clamping and retracting action of press assembly 30 be precisely limited to displacement only along press axis X—which preferably, though not necessarily, extending orthogonally relative to the plane of each filter plate 200. To impose this precise restriction of movement, a compression mechanism 320 is employed on each opposing side of filter tower assembly 20 and concurrently actuated by suitable means (not shown) to force the collapse and expansion of assembly 20 in an evenly balanced manner. In practice, however, it is often difficult to consistently provide precise enough control over multiple compression mechanisms 320 to effect absolute coordination in their actuation. What is more, peripheral portions of press plate 326 displaced from the points at which compression mechanisms 320 are coupled to the plate tend not to respond as precisely to the actuating movements of compression mechanisms 320 as those portions of press plate 326 closer to those coupling points. More compression mechanisms 320 could be provided, but the added costs in terms of both expense and complexity would be prohibitive.

Figure 4:
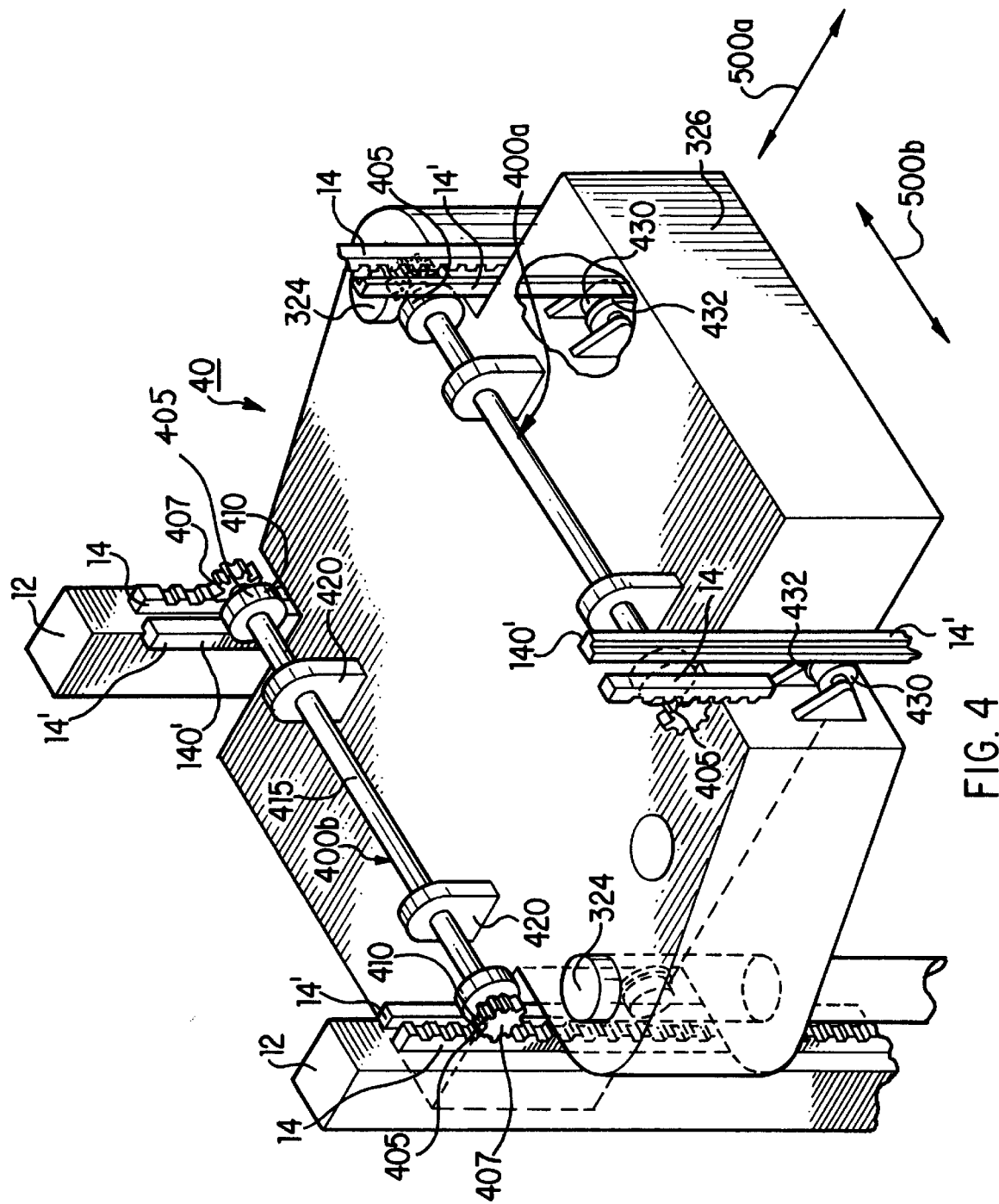
FIG. 4 is a perspective view, partially cut-away of a portion of the embodiment of the subject tower press filtering system shown in FIG. 1.

In accordance with one aspect of the present invention, stabilization assembly 40 provides the precise restriction of movement not fully utilizable by careful control over compression mechanisms 320 alone. Referring to FIG. 4, stabilization assembly 40 generally operates to automatically maintain the planar orientation of press plate 326—at all times during the course of its displacement—in fixed relation to press axis X, such that the direction of the clamping force imparted thereby to tower assembly 20 remains substantially parallel to press axis X. Stabilization assembly 40 preferably includes two sub-assemblies 400a, 400b. Each sub-assembly 400a, 400b includes a pair of coupling portions 405 keyed together for locked angular displacement by a stabilizing rod 415 that is supported on press plate 326 by one or more support blocks 420. Each coupling portion 405 includes a sprocket-type toothed roller 407 which is adapted to engage a support engagement portion 14 formed as an elongate toothed guide surface on the nearest frame assembly leg 12. Toothed roller 407 is rotatable to thus maintain meshed engagement with guide surface 14 as it moves therealong during the displacement of press plate 326 along press axis X. Note that in an alternate embodiment, support engagement portion 14 of frame assembly 10 may be realized in the form of a rotatable sprocket wheel and the coupling portion 405 of stabilization assembly 40 formed with an elongate toothed guide to which the sprocket wheel meshes.

Preferably, each coupling portion 405 also includes a stabilizing wheel 410 rotatable with toothed roller 407. Stabilizing wheel 410 engages an elongate, substantially smooth guide surface 14' formed as part of the given support engagement portion on the nearest frame assembly leg 12. While toothed rollers 407 serve primarily to lock respective peripheral portions of press plate 326 from uneven displacement in the vertical direction (in the orientation shown), stabilizing wheels 410 are configured and situated to cooperatively lock the displacement of respective press plate portions against any movement in the lateral direction indicated by bi-directional arrows 500a.

Stabilization assembly 40 preferably includes also a plurality of auxiliary stabilizing rollers 430 rotatably coupled in secure manner to press plate 326. Each auxiliary stabilizing roller 430 is configured and situated to engage a guide surface member 14', and is formed with an annular shoulder portion 432 that catches against an inner surface 140' of guide surface member 14'. Auxiliary stabilizing rollers 430, through the engagement of their shoulder portions 432 with surfaces 140' of guide surface members 14', serve primarily to lock respective peripheral portions of press plate 326 against lateral displacement in the direction indicated by bi-directional arrows 500b.

Turning back to coupling portions 405, each pair of such coupling portions 405 in a sub-assembly 400a, 400b is keyed together to rotate with stabilizing rod 415, which is rotatably supported by support blocks 420. In an alternate embodiment, various components of coupling portions 405 may be disposed in rotatable manner relative to stabilizing rod 415; or, stabilizing rod 415 may itself be fixedly retained in non-rotatable manner, with each of the coupling portion 405 components being rotatably coupled thereto.

Figure 5:
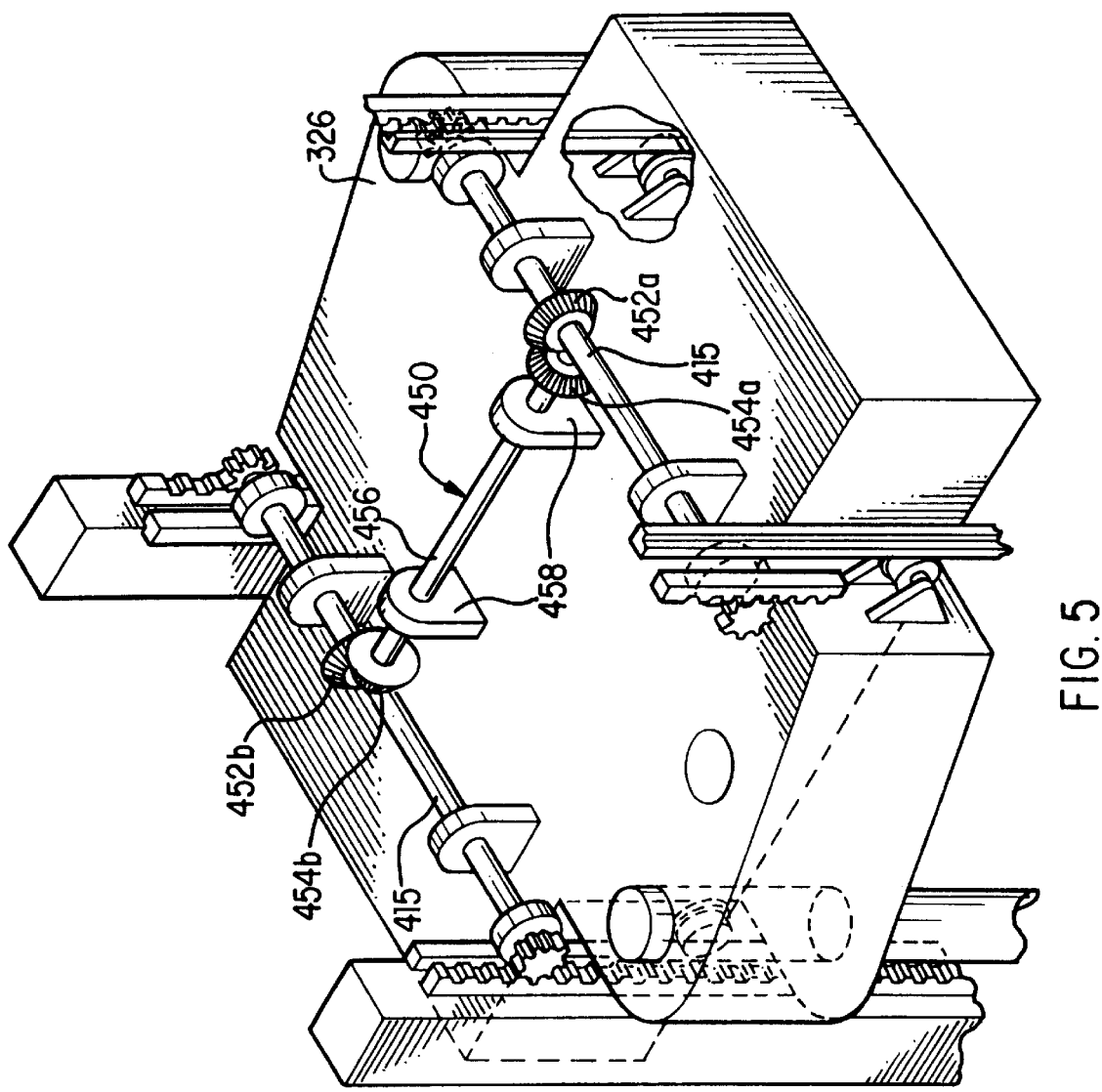
FIG. 5 is an alternate embodiment of the portion of the tower press filtering system shown in FIG. 4; and, FIG. 6 is an exploded perspective view, partially cut-away, of another portion of the embodiment of the subject tower press filtering system shown in FIG. 1.

Turning next to FIG. 5, there is shown an alternate embodiment of stabilization assembly 40 further including an auxiliary gearing mechanism 450 to key one sub-assembly 400a to the other sub-assembly 400b such that the linear/angular displacement of one is necessarily transferred to the other. Auxiliary gearing mechanism 450 includes a pair of gear members 452a,b coaxially secured in fixed manner to respective stabilizing rods 415, and a pair of gear members 454a,b coaxially coupled in fixed manner on opposing ends of a connecting arm 456 rotatably supported on press plate 326 by one or more support blocks 458. Each gear member 454a,b respectively forms a meshed engagement with a gear member 452a,b—the gear teeth formed on a gear member 454a,b intimately engaging the gear teeth formed on the given gear member 452a,b. Stabilization rods 415 of opposing sub-assemblies 400a, 400b are thus keyed for angular displacement only in locked manner.

Figure 6:
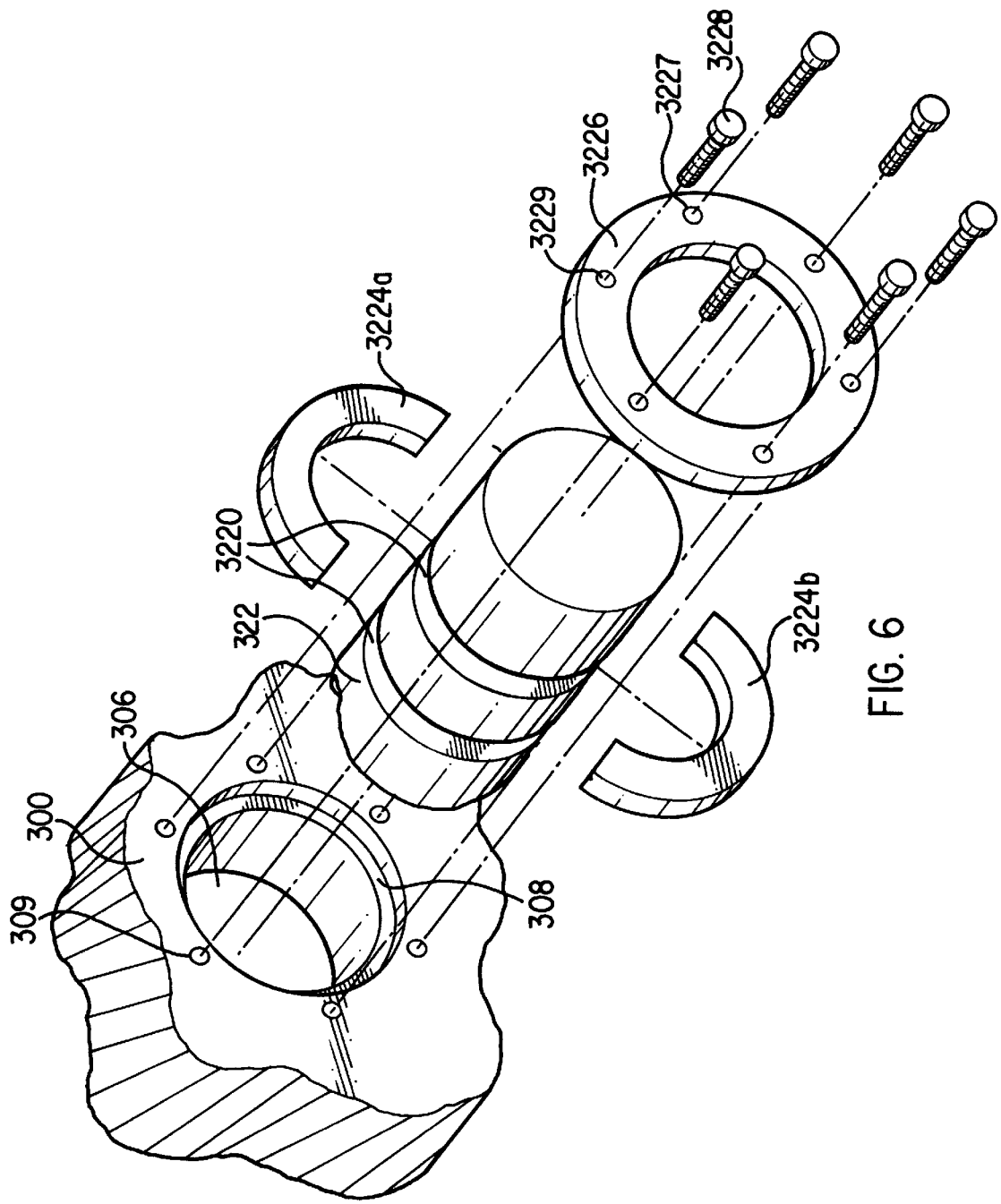

Referring now to FIG. 6, there is shown an embodiment of an adjustment means for each compression mechanism 320 of press assembly 30. It often becomes necessary in many applications of system 1 to adapt the system's configuration to a given application's operational or environment constraints. If, for instance, one or more filter plates 200 is to be added or removed from tower filter assembly 20, it becomes necessary to adjust the displacement range of compression mechanisms 320 accordingly. A typical approach known in the art is to replace a removed filter plate 200 with a spacer or other substitute member of comparable dimensions, where a filtering plate 200 is removed; or, to replace/modify the compression mechanisms 320 themselves where additional filtering plates 200 are inserted. In view of the compromised efficiency on the one hand and the requirement of a cumbersome and expensive replacement/modification procedure on the other, the coupling of each compression mechanism 320 to support plate 300 is made adjustable in accordance with one aspect of the present invention.

As shown in FIG. 6, the bottom terminal end portion of cylinder member 322 passing through an accommodating opening 306 of support plate 300 is formed with a plurality of annular grooves 3220 axially spaced one from the other. Each annular groove 3220 is configured to receive therein one or more collar members 3224a,b. Each collar member 3224a,b is so dimensioned that, once it is in place engaging an annular groove 3220, it protrudes sufficiently to abut and retentively engage a flange portion 308 formed about through opening 306 on support plate 300. A retaining member 3226 is then placed coaxially about the terminal portion of cylinder member 322 to axially retain collar members 3224a,b against support plate 300. A plurality of fastening members 3228 are then passed through fastening holes 3229 formed through retaining member 3226 for respective mated insert into screw holes 309 formed in support plate 300.

Note that in alternate embodiments, a flange portion 308 need not be formed in support plate 300, so long as other adequate measures are taken to block the radially outward escape of collar members 3224a,b. Such measures may include, for example, the formation on retaining member 3226 of an axially projecting rim portion (not shown).

Where it becomes necessary to modify the displacement range afforded by compression mechanism 320, then—either by the removal or insert of a filtering plate 200; or, by the need simply to customize the configuration of press assembly 30 for a given application—one need only engage/re-engage collar members 3224a,b with the appropriate annular groove 3220. Although only two selectable annular grooves 3220 are shown, any number of such selectable annular grooves 3220 may be formed and axially spaced by various predetermined distances to offer a wide range of selectable positions for each compression mechanism 320.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, proportional quantities of the elements shown and described may be varied, and, in the typical system operational sequences, particular steps may be reversed or interposed, all without departing from the spirit or scope of the invention as defined in the appended Claims.

What is claimed is:

1. A tower press filtering system supporting a pliant filter medium for separating the solid and liquid components of a slurry material introduced therein comprising:
   (a) a frame assembly including at least one support engagement portion;
   (b) a collapsible filter tower assembly coupled to said frame assembly, said filter tower assembly having a plurality of displaceable filter plate members adapted to engage respective portions of said filter medium passed therebetween, each said filter plate member having a manifold portion formed therein;
   (c) a press assembly coupled to said filter tower assembly, said press assembly including:
      (1) a support plate member; and,
      (2) compression means coupled to said filter tower assembly and said support plate member, said compression means being operable to retractably clamp said filter tower assembly against said support plate member along a press axis, said compression means being adapted to impart on said tower filter assembly a clamping force characterized by a predetermined force direction relative to said support plate member; and,
   (d) a stabilization assembly coupled to said press assembly and said frame assembly for automatically maintaining said predetermined force direction of said compression means clamping force in substantial alignment with said press axis during operation of said press assembly, said stabilization assembly including at least one coupling portion maintaining meshed coupling with one of said support engagement portions of said frame assembly.

2. The tower press filtering system as recited in claim 1 wherein said compression means includes a displaceable press plate member having substantially planar inner and outer surface portions, said inner surface portion engaging said filter tower assembly during said clamping thereof.

3. The tower press filtering system as recited in claim 2 wherein said compression means further includes at least one pressurized cylinder member and at least one piston member telescopically mated thereto, one of said pressurized cylinder and piston members being disposed in fixed relation to said support plate member.

4. The tower press filtering system as recited in claim 3 wherein said press assembly further includes means for adjustably coupling each said cylinder member of said compression means to said support plate member.

5. The tower press filtering system as recited in claim 4 wherein each said cylinder member includes an axially extended terminal portion passed through said support plate member, said terminal portion having formed therein a plurality of annular grooves axially spaced one from the other.

6. The tower press filtering system as recited in claim 5 wherein said adjustable coupling means includes:
   (a) at least one collar member releasably selectably engaging one of said annular grooves, said collar member being dimensioned to protrude radially from said cylinder member upon said engagement of one of said annular grooves;
   (b) a retaining member coaxially engaing said terminal portion of said cylinder member for retaining said collar against said support plate member; and,
   (c) means for releasably fastening said retaining member to said support plate member.

7. The tower press filtering system as recited in claim 2 wherein said frame assembly includes at least a pair of said support engagement portions.

8. The tower press filter system as recited in claim 7 wherein said stabilization assembly includes at least a pair of said coupling portions maintaining meshed coupling respectively with said support engagement portions.

9. The tower press filtering system as recited in claim 8 wherein at least one of said support engagement portions includes a toothed guide surface, and at least one of said coupling portions includes a toothed roller adapted to advance along said toothed guide surface.

10. The tower press filtering system as recited in claim 9 wherein each of said support engagement portions includes a toothed guide surface, and each of said coupling portions includes a toothed roller adapted to advance along one of said toothed guide surfaces.

11. The tower press filtering system as recited in claim 10 wherein at least one pair of said toothed rollers are keyed one to the other for angular displacement in mutually locked manner.

12. The tower press filtering system as recited in claim 11 wherein said stabilization assembly includes at least two pairs of said toothed rollers, each keyed pair of said toothed rollers being connected by a stabilizing rod coaxially extending therebetween.

13. The tower press filtering system as recited in claim 12 wherein said stabilization assembly further includes auxiliary gear means for keying one of said stabilizing rods to at least one other of said coupling rods for displacement thereof in locked manner.

14. The tower press filtering system as recited in claim 13 wherein each said stabilizing rod is coupled in substantially secure manner to said outer surface portion of said press plate member.

15. The tower press filtering system as recited in claim 10 wherein each of said coupling portions of said support assembly further includes a stabilizing wheel coaxially disposed adjacent said toothed roller thereof, said stabilizing wheel engaging one of said support engagement portions of said frame assembly.

16. The tower press filtering system as recited in claim 2 further comprising a port assembly coupled to said frame assembly, said port assembly including a substantially rigid conduit segment passing through said press plate member to coaxially couple with said manifold portion of at least one of said filter plate members of said filter tower assembly.

17. The tower press filtering system as recited in claim 16 wherein said port assembly includes a resilient means for connecting said conduit segment to a fluid injection port.

18. A tower press filtering system for separating the solid and liquid components of a slurry material introduced therein comprising:

(a) a frame assembly;

(b) a press plate member displaceably coupled to said frame assembly;

(c) a support plate member coupled to said frame assembly;

(d) a plurality of substantially planar filter plate members displaceably coupled to said frame assembly and adapted to supportingly engage respective portions of a continuous filtering medium passed therebetween, said filter plate members being disposed in substantially parallel manner intermediate said pressure plate and said support plate members, each said filter plate member having a manifold portion formed therein;

(d) a clamping assembly coupled to said support plate member for retractably clamping said filter plate members against said support plate member, said clamping assembly including a linearly displaceable press plate member adapted to bear against said filter plate members, said press plate member having a substantially planar outer surface portion disposed in a predetermined planar orientation; and, (e) a stabilization assembly coupled to said clamping and frame assemblies for maintaining said predetermined planar orientation of said press plate member outer surface portion during operation of said clamping assembly.

19. The tower press filtering system as recited in claim 18 further comprising means for adjustably coupling said clamping assembly to said support plate member.

20. A tower press filtering system for separating the solid and liquid components of a slurry material introduced therein comprising:

(a) a frame assembly;

(b) a support plate member adjustably coupled to said frame assembly;

(c) a press plate member displaceably coupled to said frame assembly, said press plate member being disposed in a predetermined planar orientation relative to said support plate;

(d) a plurality of substantially planar filter plate members displaceably coupled to said frame assembly and adapted to supportingly engage respective portions of a continuous filtering sheet therebetween, said filter plate members being disposed in substantially parallel manner intermediate said pressure plate and said support plate members, each said filter plate member having a manifold portion formed therein;

(e) compression means coupled to said press plate and said support plate members for reversibly displacing said press plate member toward said support plate member to clamp said filter plate members one against the other, said compression means including a stabilization assembly for locking said predetermined planar orientation of said pressure plate member relative to said support plate member during said reversible displacement thereof; and, (f) a port assembly having a resilient link member adapted for coupling to a fluid injection port and a substantially rigid conduit segment extending therefrom, said conduit segment extending through said press plate member maintaining coaxial coupling with said manifold portion of at least one of said filter plate members.

* * * * *